(12) United States Patent
Reinertsen

(10) Patent No.: US 6,860,104 B2
(45) Date of Patent: Mar. 1, 2005

(54) AUTOMATIC TRANSMISSION

(76) Inventor: Kai-Tommy Reinertsen, Skolivn, 54, N-1712 Graalum (NO)

( * ) Notice: Subject to any disclaimer, the term of this patent is extended or adjusted under 35 U.S.C. 154(b) by 0 days.

(21) Appl. No.: 10/181,410
(22) PCT Filed: Jan. 24, 2001
(86) PCT No.: PCT/NO01/00025
§ 371 (c)(1),
(2), (4) Date: Oct. 3, 2002
(87) PCT Pub. No.: WO01/53725
PCT Pub. Date: Jul. 26, 2001

(65) Prior Publication Data
US 2003/0074894 A1 Apr. 24, 2003

(30) Foreign Application Priority Data
Jan. 24, 2000 (NO) .......................................... 20000361

(51) Int. Cl.$^7$ .............................................. F16H 61/44
(52) U.S. Cl. ........................................ 60/425; 60/483
(58) Field of Search ........................ 60/425, 464, 468, 60/483, 494

(56) References Cited
U.S. PATENT DOCUMENTS
2,370,526 A 2/1945 Doran
3,123,975 A 3/1964 Ebert
3,190,075 A 6/1965 Ebert
5,012,644 A * 5/1991 Yoshida ....................... 60/425

* cited by examiner

Primary Examiner—Thomas E. Lazo
(74) Attorney, Agent, or Firm—Dennison, Schultz, Dougherty & MacDonald

(57) ABSTRACT

Automatic transmission, comprising at least one primary hydraulic pump (1) arranged to be powered by a motor, said primary pump (1) being arranged to power a number of at least two secondary hydraulic pumps ($2_1$–$2_n$) which are mechanically connected to an outgoing propeller shaft (6), the secondary hydraulic pumps being arranged for active powering of said outgoing propeller shaft when the hydraulic pressure caused by the primary pump in a closed room (A) between the primary pump and the secondary pumps, reaches predetermined levels which are different for the various secondary pumps ($2_1$, $2_2$ and ... $2_n$ respectively). Each of the secondary hydraulic pumps ($2_1$–$2_n$) is preferably closed by means of a mechanical spring resistance from a coil spring ($2_{13}$–$2_{n3}$) against a valve ($2_{12}$–$2_{n2}$) which abuts a valve seat, until the pressure from the primary pump (1) gets sufficiently high to overcome the resistance from said coil spring, the secondary hydraulic pumps ($2_1$–$2_n$) having individually adapted springs ($2_{13}$–$2_{n3}$) which open at mutually different pressures.

5 Claims, 3 Drawing Sheets

AUTOMATIC TRANSMISSION

Figure 1:
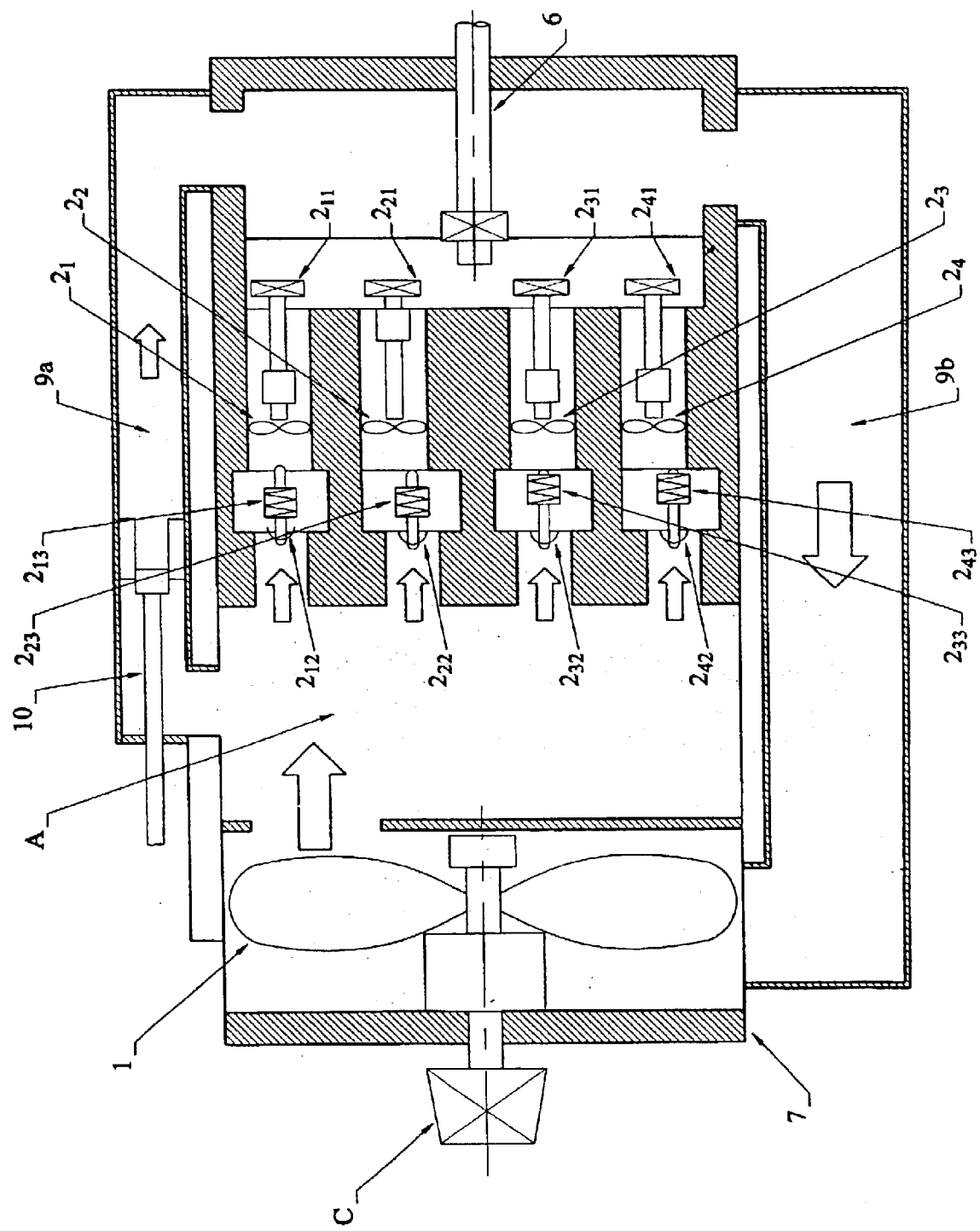

The present invention relates to an automatic transmission. The present invention further relates to a utilization of such an automatic transmission.

BACKGROUND

It is well known from various connections to utilize automatic transmissions to adapt the power and the speed from a motor to an outgoing propeller shaft, so that the motor, which may have a rather narrow range of rotational speed at which it operates really well, shall be able to function efficiently under varying conditions of operation.

Such transmissions are used for motor powered vehicles, like small and large cars, hereunder trucks, in large and small boats, for two-wheeled vehicles and in a lot of connections industrially where power transmissions are needed. Such transmissions are especially important in combination with engines that work well within only a narrow range of rotational speed, which is typically for petrol engines.

State of the Art

Ordinary automatic transmissions transmit the power via different sized gear wheels that are moved in and out of engagement with each other under influence of an automatic clutch mechanism, depending upon several changing control parameters. Such control parameters may include the rotational speed of the engine, the power (torsional moment) on the shaft into the transmission, and/or the shaft leaving the transmission, and for petrol engines the vacuum in the carburettor, etc. Lately so-called "smart" transmissions that react upon a lot of different parameters have been developed, which are therefore able to react more "correct" in accordance with the relevant conditions.

Common for the known automatic transmissions, however, they all include expensive and vulnerable control systems comprising electronic equipment. They are expensive to manufacture and they may be expensive to repair due to the many different mechanical and electronic components that may break or fail.

It is furthermore a disadvantage with such transmissions that they have a relatively high loss of effect from the incoming to the outgoing shaft.

Objective

It is thus an object of the present invention to provide an automatic transmission which is simple and inexpensive to manufacture and useful for both vehicles and for industrial applications.

It is furthermore an object to provide an automatic transmission that is not dependent upon complicated or vulnerable electronic components, and which is still able to effectively adapt to varying conditions, so that the motor may work at a convenient rotational speed and at a convenient resistance (load).

It is still further an object to provide an automatic transmission that has small outer dimensions and low weight.

It is still further an object to provide an automatic transmission that exhibits a low loss of effect.

It is even further an object to provide an automatic transmission that has few moveable components that may be worn.

The Invention

The mentioned objectives are obtained by an automatic transmission according to the invention.

Figure 2:
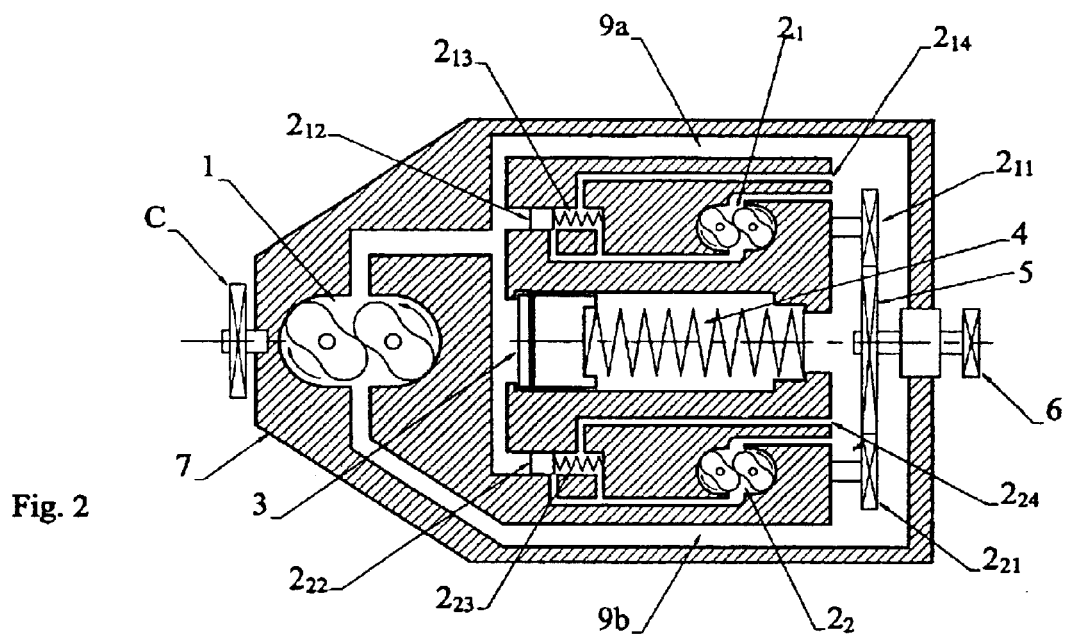
Figure 3:
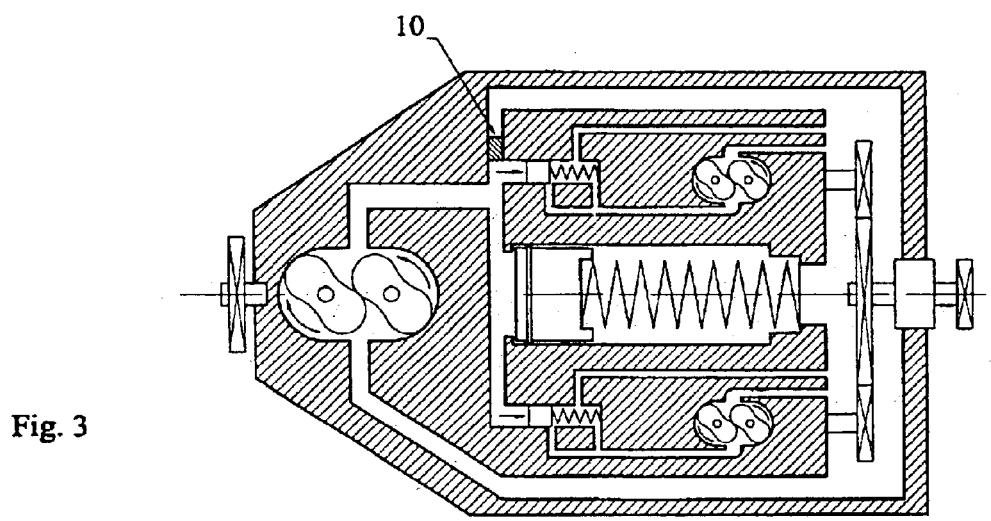
Figure 4:
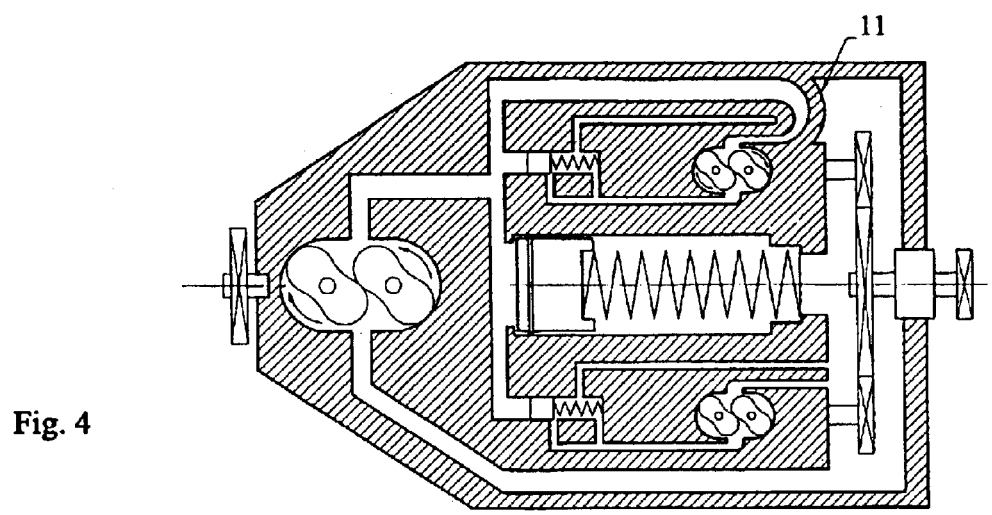
Figure 5:
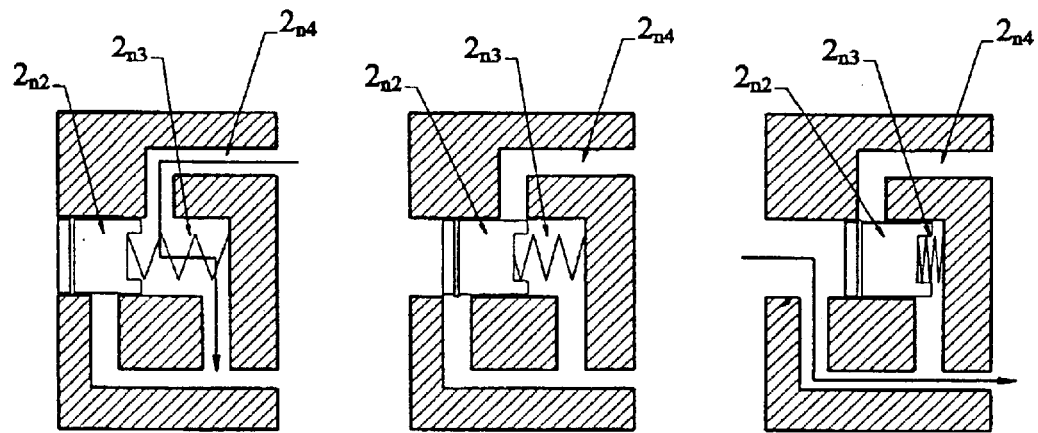
Figure 6:
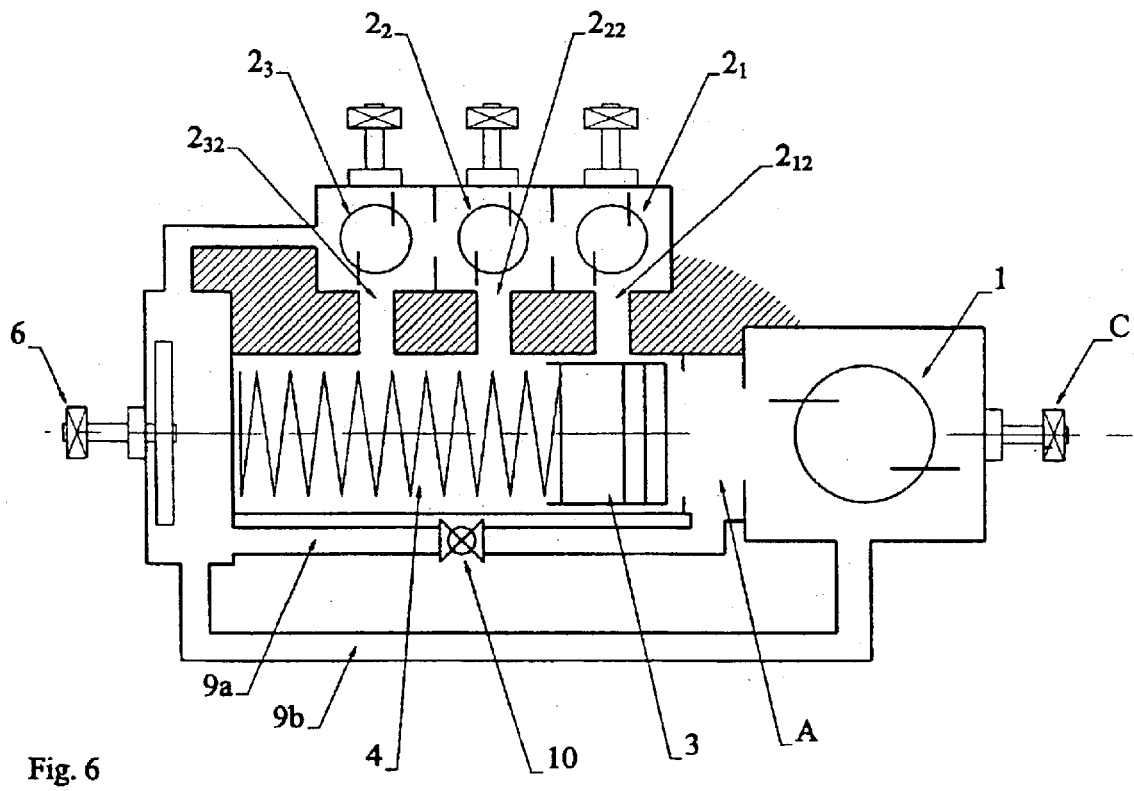

In the following a closer description of a preferred embodiment of the invention is given with reference to the enclosed drawings, in which:

FIG. 1 is a schematic sectional view of a transmission according to the invention, comprising four secondary hydraulic pumps, FIG. 2 is a schematic sectional view of a transmission according to the invention comprising two secondary pumps, the transmission being disengaged (in a free gear), FIG. 3 is a schematic sectional view of a transmission according to the invention comprising two secondary pumps, the transmission being engaged, FIG. 4 is a schematic sectional view of a transmission according to the invention comprising two secondary pumps, the transmission being engaged in its reverse gear, FIG. 5a–5c shows details of the valve mechanism for an arbitrary secondary pump in three different positions, FIG. 6 is a schematic view of a different embodiment of the invention compared to the transmission of FIGS. 1–5.

FIG. 1 shows a transmission according to the invention comprising a primary hydraulic pump 1 (on FIG. 1 depicted as a simple fan) that via a shaft C is powered by the motor in question, said pump being arranged to circulate an hydraulic oil through a loop. Depending upon the pressure the circulating oil powers a varying number of secondary pumps $2_1$–$2_4$ (depicted as simple fans) in such a way that these on their side power an outgoing propeller shaft with a gear ratio that varies in accordance with the pressure, in practice with the number of secondary pumps $2_1$–$2_4$ that are engaged at the relevant point in time.

In practice the transmission is arranged in a substantially cylindrical housing 7 with a centrally arranged piston 3 which can be forced back a limited way against the resistance from a relatively large coil spring 4. On the other side of said piston relative to the said primary hydraulic pump, the outgoing propeller shaft 6 is positioned. Concentrically arranged around this piston a number of smaller, secondary hydraulic pumps $2_1$–$2_4$ are arranged with gear wheels $2_{11}$, $2_{21}$, $2_{31}$, $2_{41}$ attached to their back sides, said gear wheels being in continuous engagement with a gear wheel 5 on the outgoing propeller shaft 6.

Principally each of these secondary hydraulic pumps constitutes a gear (ratio). Each secondary hydraulic pump is closed with a respective valve $2_{12}$, $2_{22}$, $2_{32}$, $2_{42}$ assisted by a respective coil spring $2_{13}$, $2_{23}$, $2_{33}$, $2_{43}$, each of which exhibits a resistance different from the resistance of all the other coil springs, so that all valves of the secondary hydraulic pumps opens and closes at different pressures. In the following the index "n" is used to designate an arbitrary chosen pump, valve, coil spring or gear wheel. Until the pressure becomes sufficiently high to cause the respective secondary pumps to open, the hydraulic oil cannot flow through the pump in a way in which it contributes to the power transmission. There is, however, on the back side of each pump, near its gear wheel $2.\text{sub}.n1$, arranged a "blind passage" $2.\text{sub}.n4$ (FIG. 2 and FIG. 5) allowing oil to flow through the pump in a way in which it may passively follow the propeller shaft 5 with the speed this assumes at any time, which is described in further detail with reference to FIG. 5 below.

When the transmission is in free gear, oil is only circulating in an external loop 9a, 9b that does not include any of the secondary pumps. As long as the loop 9a, 9b remains open, no pressure will be built up in the room A between the primary pump and the secondary pumps.

At start of operation a valve 10 in the external loop is closed, cf. FIGS. 1 and 3, so that a pressure starts to build up between the primary pump 1 and the centrally positioned piston 3, as well as against each of the valves $2_{n2}$ that closes for through-put of oil through the secondary pumps. FIG. 3 shows a situation where the pressure is still not high enough for any of the valves to open, while the arrows against the valves $2_{n2}$ indicates that a pressure build up has started. In FIG. 3 reference numerals to details identical to the ones of FIG. 2 are omitted. As the pressure increases the valves $2_{12}$, $2_{22}$, $2_{32}$, $2_{42}$ (FIG. 1) start to open one by one, with the consequence that oil is allowed to flow there through. The way hydraulic pumps are designed, there is a fixed ratio between the amount of oil passing through and their rotation. Depending on the resistance on the outgoing propeller shaft, it may so be that the pressure needs to be large enough for all secondary valves to open before the outgoing propeller shaft starts to rotate, and the vehicle—if the transmission is used in a vehicle—starts to move.

FIG. 4 shows schematically how a reverse gear is arranged by means of a switch mechanism 11 in the flow path 9a, leading the oil in the opposite direction compared to ordinary operation and through one or more of the secondary hydraulic pumps $2_n$. With such a mechanism the valves $2_{n2}$ are by-passed entirely. If it is desired that the reverse gear shall be as low as the lowest forward gear, the switch mechanism must be connected to all the secondary pumps $2_1$–$2_n$.

In the following exemplification it is assumed that the transmission is positioned in a motor vehicle, for example a private car. When the valves of all the secondary pumps are open, the transmission is in first gear. Oil will then flow through all the pumps so that all pumps contribute to the propelling the leaving shaft. The momentum on the shaft is therefor large. As the oil is distributed to several pumps, the flow rate in each of them will be relatively low and the gear wheels at the pumps back side will rotate correspondingly slow. Low speed and large momentum is a typical feature for a low gear, on this transmission as for others.

When the resistance on the outgoing propeller shaft is reduced somewhat, the valve with the highest coil spring force of the secondary pumps, will close. The oil pumped by the primary pump will then have a lesser area to flow through, and the flow rate through the remaining open pumps will increase correspondingly. This means that the closing of the valve with the highest coil spring force, corresponds to a shift from the lowest gear to the second gear. This will go on until all but the last valve of the secondary pumps have been closed, when driving with moderate resistance on the outgoing propeller shaft (not uphills) and at moderate speeds. If the accelerator is pushed substantially or going uphill, increased force on the ingoing propeller shaft and increased resistance on the outgoing propeller shaft respectively, will lead to a pressure increase which will cause more valves (at least one) to open again, which corresponds with shifting to a lower gear (ratio).

FIG. 5a shows valve $2_{n2}$ and coil spring $2_{n3}$ for an arbitrary secondary hydraulic pump in a closed condition, in which the oil flow indicated by an arrow, comes from the blind passage $2_{n4}$ to the pump (not shown) and leaves on the same side that it enters. This does not affect the pressure anywhere in the system, and represent a condition where the shown pump passively follows the outgoing propeller shaft 6. When a pressure increase takes place in the room between the primary and the secondary pump(s), the valve $2_{n2}$ will at a certain pressure start to move backwards (to the right) as shown in FIG. 5b. In the shown condition, for a short moment the valve will close both passages. The secondary pump (not shown in FIG. 5b) however, is still rotating and will pull oil out from the back side of the valve as the valve continues to open, and from this moment in time valve $2_{n2}$ will start to let some oil in from the room A, while the blind passage is now fully closed. When the valve has moved back completely, the entire cross section of the through duct is open so oil can flow unhindered there through. On the outgoing propeller shaft 6 the change will be noticed as a soft shifting down to lower gear, as the pump in question shifts from the passive state where it simply follows the outgoing propeller shaft 6 to an active state where it contributes to the powering of the same.

FIG. 6 shows an alternative embodiment of the transmission according to the invention. It is based on the same general principle with an ingoing primary hydraulic pump 1 and several outgoing, secondary hydraulic pumps $2_1$, $2_2$ og $2_3$ (three secondary pumps in the shown embodiment). The main difference from the embodiment shown in FIGS. 1–5 is that the secondary valves do not open against the resistance from individual coil springs, as the valve function is completely controlled by the position of the centrally located piston 3. This piston opens the ducts to 0, 1, 2 or 3 secondary pumps depending upon the pressure in the room A and the thereof following position of piston 3. It is thus understood that this embodiment does not include any secondary valves as the inlets to the ducts are positioned in the cylinder surface in which the piston 3 moves, the piston itself constituting the valve function. The outer configuration with the secondary pumps arranged concentrically around the circumference of the cylinder of piston 3 may be applied also for this embodiment, although this is not indicated by FIG. 6.

For a transmission for a private car, four secondary pumps will normally be fully satisfying, provided that the individual coil springs of the secondary pumps are conveniently dimensioned. For a small boat fewer gears will normally suffice. On the other hand, if as much as four gears are applied for a boat, a higher degree of freedom is obtained with respect to choice of propeller, as the gearbox will then to a higher degree be able to adapt the speed of the outgoing propeller shaft according to the conditions. Correspondingly, when using more gear ratios for automobiles, the same transmission may be applied to models with different size and motor power.

There is further the feature that piston 3, which is centrally arranged in a tight enclosing cylinder and attached to a coil spring 4 with a resistance large enough to hold back the piston from being pushed all the way back even when the oil pressure is high enough to open all the valves of the secondary pumps, will contribute to a temporary storage of energy when e.g. the accelerator is pushed down incautiously. This energy is not lost as it is "stored" in the coil spring 4 and released again through the outgoing propeller shaft 6 when the pressure comes down to a lower level. The cylinder in which the piston 3 moves, is open in both ends so that the total volume available for the oil is independent of the position of piston 3. The presence of piston 3 and coil spring 4 furthermore makes the system work "softer", e.g. at start-up, as any abrupt change of pressure is first absorbed by the coil spring 4 and shortly thereafter in a resilient way transferred to one or more of the secondary hydraulic pumps $2_1$–$2_n$ as soon as they start to open. As the hydraulic fluid does not have exhibit any compressibility, it is convenient to include such an arrangement, which contributes to a resilient transferral of power with no loss. The presence of such a piston constitutes a kind of clutch mechanism as an integral part of the transmission itself, An additional effect of piston 3 and the coil spring 4 can be obtained by deliberate building up a high pressure in the room A while brakes holds the outgoing propeller shaft from rotating. The coil spring is then forced back an extra distance, and when the brakes are released a momentary effect the significantly exceeds the motor power may be observed, which e.g. may be utilized for extra rapid acceleration from a position at rest.

Adaption of the transmission to large and small outputs respectively (e.g. large/small vehicles) is made by adapting dimensions and primarily the resistance of each of the coil springs that provides the valve with a closing force. For special needs also the dimensions of the gear wheels on each of the secondary pumps may be changed. For normal situations they can all have the same dimension, as it is not primarily the dimensions of the gear wheels that decide the gear ratio for such a transmission, but the speed with which the oil flows through the currently active secondary pumps.

If desired and depending upon the needs, the ducts to the various secondary pumps may also be made with different cross sections, in order to obtain a gear ratio different from what would else have resulted. If e.g. an extremely low first gear is needed, i.e. the outgoing shaft should rotate with particularly low speed, a higher cross section for the duct and the valve opening may be used for the secondary pump whose valve opens at the highest pressure, together with a corresponding adaption of the hydraulic pump $2_{n(max)}$, itself, so that the pump lets through more oil pr. cycle than the other secondary hydraulic pumps. A corresponding effect may also be obtained by utilizing different number of teeth for the different gear wheels $2_{11}, 2_{21}, \ldots$ and $2_{n1}$ respectively.

The opening and closing movements of the valves for through-put of oil to the secondary pumps $2_n$, have a double function as the valves simultaneously closes and opens respectively the so-called "blind passage" for the oil on the backside of the secondary pumps. Oil will always flow through the secondary pumps, either from front side to back side when the pump acts as a motor that powers the gear wheel on the outgoincg side of the pump, or through the "blind passage", in from the back side and out on the back side when the pump passively follows the outgoing shaft. When the oil flows in the blind passage, both inlet and outlet are on the outgoing side/back side of the secondary pumps, which means that these flows do not contribute to any change of the pressure built by the primary pump. It is this feature that allows the simple arrangement that the gear wheels $2_{n1}$ of the secondary pumps $2_n$ and the gear wheel 5 on the outgoing propeller shaft need never be brought from engagement with each other. This mechanism provides an aspect of the invention which renders an external clutch mechanism superfluous, which in itself constitutes a new feature for such a transmission.

Different modifications may be made compared to the embodiments described above without departing from the scope of the invention. Such a modification may consist in replacing the centrally arranged piston 3 with a flexible fabric or "bubble" which is sealingly arranged in the through cylinder. When pressure is built up on the side of the primary pump, the "bubble" will bulge out in the opposite direction to an extend decided also by the flexibility of the material. Such a solution is firstly relevant in application where the forces that are to be transferred by the transmission are relatively small.

In addition one or more of the gear wheels of the secondary hydraulic pumps $2_n$ may be replaced with ratchet type gears that only grip one direction and spin freely in the other direction. Such a ratchet gear is able to power another gear in one direction, but if the other gear starts to rotate faster, the ratchet gear will spin on its shaft. With no power to the shaft on which the ratchet gear is mounted, only the gear rim of this wheel will follow gear wheel 5 on the outgoing shaft, while the corresponding secondary hydraulic pump will be left at rest. As the currently passive pumps is are left at rest they will not cause any loss of effect in the transmission. When the corresponding valve again opens subsequent to an increase in pressure, the ratchet gear will again start to rotate and contribute to the powering of the gear wheel 5 on the outgoing propeller shaft. A shift to a lower gear thereby takes place. With the use of ratchet gears there is no need for any blind passages in connection to the valves of the secondary pumps, as they are allowed to come to rest. The valve function as such is therebyalso simplified with this design for the gear wheels.

A transmission as described above has the following properties and advantages: It has few moveable parts and few components that may be worn and need maintenance. It has a lower loss of effect than traditional transmissions, typically 2–5%.

It makes use of a clutch superfluous, being a "logical" part of the new transmission. The shifts are noiseless and hardly unnoticeable.

The system is hermetically sealed and self-lubricating with oil.

It needs neither electronics nor cables to operate.

Dimensions and weight are low.

The manufacturing costs are low.

Even though the embodiments described above mainly have been related to use of the transmission in an automobile, it should be understood that the advantages and the adaptions of use mentioned above is largely universal, and not connected to any particular area of use. Even in an area as distance from a car as a drill chuck, the advantages of an automatic shift to a lower gear ratio according the transmission of the invention, is beneficial e.g. when the resistance on the outgoing propeller shaft is abruptly increased.

The same may be said about transmissions for industrial applications, where it is necessary to transfer power under varying conditions, and where some kind of transmission is already in use with today's technology.

For most purposes it is convenient to use only one primary hydraulic pump. Where the consideration of reliable operation way overshadows the consideration of low cost etc., there is nothing that prevents the arrangement of two pumps working continuously in parallel or where one with a grip may be engaged if the other fails.

What is claimed is:

1. Automatic transmission, comprising at least one primary hydraulic pump (1) arranged to be powered by a motor, said primary pump (1) being arranged to power a number of at least two secondary hydraulic pumps ($2_1$–$2_n$) which are mechanically connected to an outgoing propeller shaft (6), the secondary hydraulic pumps being arranged for active powering of said outgoing propeller shaft when the hydraulic pressure caused by the primary pump in a closed room (A) between the primary pump and the secondary pumps, reaches predetermined levels which are different for the various secondary pumps ($2_1$, $2_2$ and $\ldots$ $2_n$ respectively), wherein each of the secondary hydraulic pumps are closed by means of a mechanical spring resistance from a coil spring ($2_{13}$–$2_{n3}$) against a valve ($2_{12}$–$2_{n2}$) which abuts a valve seat, until the pressure from the primary pump (1) gets sufficiently high to overcome the resistance from said coil spring, the secondary hydraulic pumps ($2_1$, $2_2$ and ... $2_n$ respectively) having individually adapted springs ($2_{13}$, $2_{23}$ and ... $2_{n3}$ respectively) which open at mutually different pressures, wherein the secondary hydraulic pumps ($2_1$, $2_2$, ... $2_n$) all have a respective blind passage ($2_{14}$, $2_{24}$, ... $2_{n4}$) for oil enabling them to passively follow the outgoing propeller shaft (6) when they do not actively power the shaft, and wherein the secondary hydraulic pumps ($2_1$, $2_2$, ... $2_n$) are equipped with ratchet gears which enables them to stop when they do not actively power the outgoing propeller shaft (6).

2. Automatic transmission according to claim 1, characterized in that the room (A) between the primary pump (1) and the secondary hydraulic pumps ($2_1$–$2_n$) also comprises a piston device (3) that against the resistance of a relatively strong coil spring (4) contributes to holding a balanced pressure in the room (A), giving flexibility to the power transmission mechanism and allowing the pressure to be varied within a wide range while simultaneously ensuring that the transfer of power to the outgoing propeller shaft (6) via the secondary hydraulic pumps ($2_1$–$2_n$) is effected resiliently and without any loss of effect while avoiding high transient loads.

3. Automatic transmission according to claim 2, characterized in that the piston device (3) is substituted by a flexible strong membrane or bubble which depending upon the pressure in the room (A) will bulge out more or less in the direction of the outgoing propeller shaft (6).

4. Automatic transmission according to claim 3, characterized in that it comprises a number of secondary hydraulic pumps ($2_1$–$2_n$) corresponding to the desired number of gear ratios.

5. A private automobile including a transmission as defined by claim 1, comprising primary hydraulic pump and four secondary hydraulic pumps ($2_1$–$2_4$) for a private car.

* * * * *